(12) United States Patent
Kokubo

(10) Patent No.: US 6,400,263 B1
(45) Date of Patent: Jun. 4, 2002

(54) TIRE PRESSURE MONITORING SYSTEM

(75) Inventor: Shoichi Kokubo, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/620,466

(22) Filed: Jul. 20, 2000

(30) Foreign Application Priority Data

Jul. 23, 1999 (JP) ............................................ 11-208479

(51) Int. Cl.[7] ................................................ B60C 23/00
(52) U.S. Cl. ...................................... 340/447; 340/442
(58) Field of Search ................................. 340/442, 444, 340/445, 447; 73/146.3, 146.5, 705, 714

(56) References Cited

U.S. PATENT DOCUMENTS 5,825,286 A * 10/1998 Coulthard .................... 340/447
5,837,891 A * 11/1998 Bridge ......................... 340/447
5,883,305 A * 3/1999 Jo et al. ...................... 73/146.5
6,087,930 A * 7/2000 Kulka et al. ................. 340/447
6,112,165 A * 8/2000 Uhl et al. .................... 340/447

* cited by examiner

Primary Examiner—Van Trieu
(74) Attorney, Agent, or Firm—Rabin & Berdo, P.C.

(57) ABSTRACT

A tire pressure monitoring system driven by a battery power source allowing radio transmission of a monitor signal of a detection value of tire pressure detected by a sensor. The transmission is to the vehicle via a transmitting section in the monitoring system. A control section in the system compares the detection value from the sensor with a set value, and based on a comparison result, controls radio transmission of the monitor signal by the transmitting section. Prior to normal radio transmission of the monitor signal, radio transmission of the monitor signal is controlled by the control section. The sensor preferably comprises a temperature sensor.

13 Claims, 6 Drawing Sheets

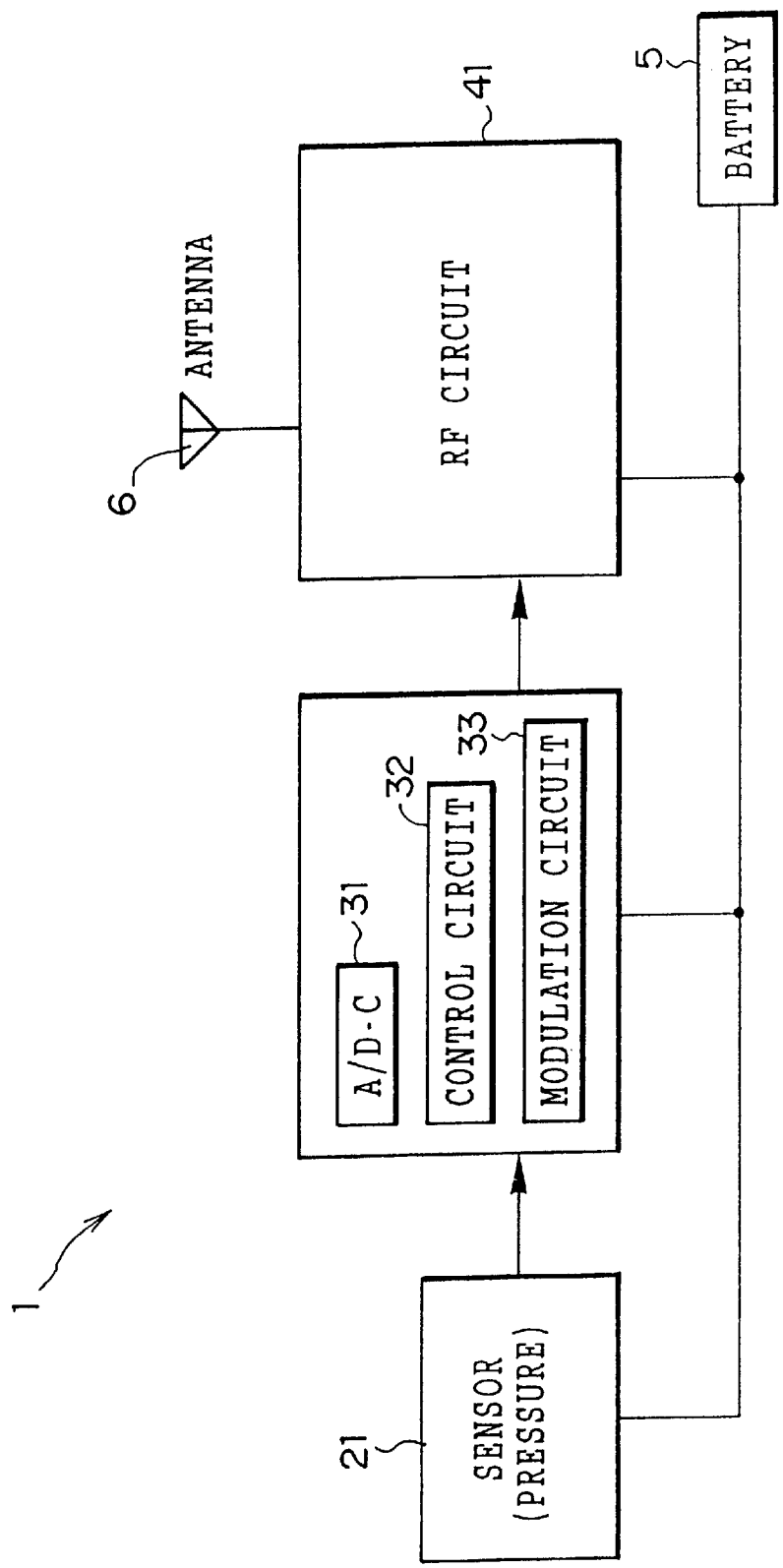

APPLIED EXAMPLE OF CONVENTIONAL SYSTEM

TIRE PRESSURE MONITORING SYSTEM

BACKGROUND OF THE INVENTION

1. Field of the Invention

The present invention relates to a tire pressure monitoring system, and particularly to a battery-driven tire pressure monitoring system for radio transmission of a tire pressure monitor signal detected by a sensor.

2. Description of the Related Art

FIG. 5 is a block diagram which shows a basic structure of a conventional system, and FIG. 6 is a block diagram which shows an applied example of the system shown in FIG. 5. In FIG. 5, reference numeral 1 denotes a tire pressure monitoring system. Reference numerals 21, 31, 32, 33, and 41 respectively denote a pressure sensor, an analog/digital converter (A/D-C) circuit, a control circuit, a modulation circuit, and a radio frequency (RF) circuit having an amplifier. For example, a piezoresistance type semiconductor pressure sensor is used as the pressure sensor 21. Reference numerals 5 and 6 denote a driving battery power source and an antenna, respectively. The RF circuit 41 amplifies a modulation signal and performs radio transmission of a monitor signal to the main body of the vehicle via the antenna 6. The RF circuit 41 consumes the greatest amount of electric power in the monitoring system 1. In a special environment in which wire communication cannot be carried out, for example, in a rotating tire, the RF circuit 41 is important. Alternative means such as optical communication has been proposed. However, a system in which the RF circuit 41 is used, is predominant at the present.

In this type of tire for a vehicle, a valve for air pressurization is provided. A metal rim is assembled to an inner peripheral portion of the tire, for mounting to a wheel axle. The interior of the manufactured tire is maintained substantially at atmospheric pressure, and the tire is placed, for example, in a storehouse. That is, the tire is stored in a non-pressurized state. Thereafter, tires finished as products and placed in storage are transferred to a place for manufacturing various types of vehicles and mounted on axles. There are cases in which some tires are exhibited at a store for selling articles for vehicles or at a service station and tires purchased by general consumers are mounted in private cars or in vehicles used for business purposes. The tires mounted to an axle or a spare tire are each filled, via the above-described valve, with a predetermined air pressure suitable for vehicle operation.

The tire pressure monitoring system 1 is mounted on a rim or within a valve at the time of assembling the tire. Normally, when the tire pressure monitoring system 1 is mounted, simultaneously, a transmitter operation is initiated via the antenna 6. More particularly, a monitor signal is transmitted through the RF circuit 41, which unfortunately has a high consumption rate of battery power. Therefore, the life span of the battery 5 is shortened. In order to prevent power consumption by a tire in storage, prior to tire pressurization, it has been proposed to use a mechanical pressure switch Sw is, as shown in FIG. 6. The switch Sw opens the power source circuit when tire pressure is at predetermined value or less. However, during a vehicle operation, the tires are subjected to heavy vibrations while rotating. Therefore, it is difficult to provide a satisfactory mechanical switch Sw. Even if a mechanical switch is provided, a malfunction (unintended opening or closing of the switch) may be likely to occur due to the vibrations.

Further, if a pressure switch Sw is provided in the power source circuit of the battery 5, the number of parts increases, which results in increased cost for the tire pressure monitoring system 1.

Additionally, it is desirable to separately distinguish tires placed in storage or mounted in a vehicle from those used for another vehicle. Accordingly, an identification is often incorporated within the tire pressure monitoring system 1 for identifying the tire. The identifications need to be stored somewhere in the tire pressure monitoring system 1. However, when a volatile memory (RAM; see FIG. 6) for storage of identification is provided, the drawback of battery power consumption further increases, along with cost of the system, and so on.

The present invention has been devised to address the above-described conventional drawbacks, and provide a tire pressure monitoring system having advantages not provided by conventional systems.

SUMMARY OF THE INVENTION

In accordance with a first aspect of the present invention, there is provided a tire pressure monitoring system driven by a battery, comprising: a comparator which makes a comparison between a predetermined value and a detection value of any one of tire pressure and an amount related to tire pressure; and a controller which controls so as to start transmission of the detection value based on a result of the comparison by the comparator.

In accordance with a second aspect of the present invention, there is provided a tire pressure monitoring system driven by a battery, comprising: a sensor which detects any one of tire pressure and an amount related to tire pressure; a transmitter which transmits a detection value detected by the sensor; and a controller which makes a comparison between a predetermined value and the detection value detected by the sensor, and when the detection value is greater than the predetermined value, the controller controls the transmitter so as to start transmission of the detection value.

In accordance with a third aspect of the present invention, in the second aspect of the present invention, when the detection value is less than the predetermined value, the controller controls the transmitter so as not to cause transmission of the detection value.

In accordance with a fourth aspect of the present invention, in the second aspect of the present invention, after transmission of the detection value is once started, the controller controls the transmitter so as not to stop the transmission.

In accordance with a fifth aspect of the present invention, in the second aspect of the present invention, the sensor is a pressure sensor for detecting tire pressure.

In accordance with a sixth aspect of the present invention, in the second aspect of the present invention, the sensor is a temperature sensor for detecting a temperature related to tire pressure.

In accordance with a seventh aspect of the present invention, in the second aspect of the present invention, the controller includes:

a first storage device for holding the predetermined value;
  a second storage device for holding the detection value;
  a comparator which makes a comparison between the predetermined value held in the first storage device and the detection value held in the second storage device; and
  a transmission enable flag set based on a result of the comparison by the comparator, the controller being provided to control the transmitter based on setting of the transmission enable flag.

Further, a memory in which an identification inherent in each tire is stored is provided, and the identification is transmitted together with the detection value during the transmission.

In accordance with an eighth aspect of the present invention, there is provided a tire pressure monitoring method comprising the steps of: (a) detecting any one of tire pressure and an amount related to tire pressure; (b) comparing a detection value detected in the step (a) with a predetermined value; and (c) when the detection value is greater than the predetermined value as a result of the comparison in the step (b), starting transmission of the detection value.

BRIEF DESCRIPTION OF THE DRAWINGS

FIG. 5 is a block diagram which shows a basic structure of a conventional system.

DESCRIPTION OF THE PREFERRED EMBODIMENTS

[First Embodiment]

Figure 1:
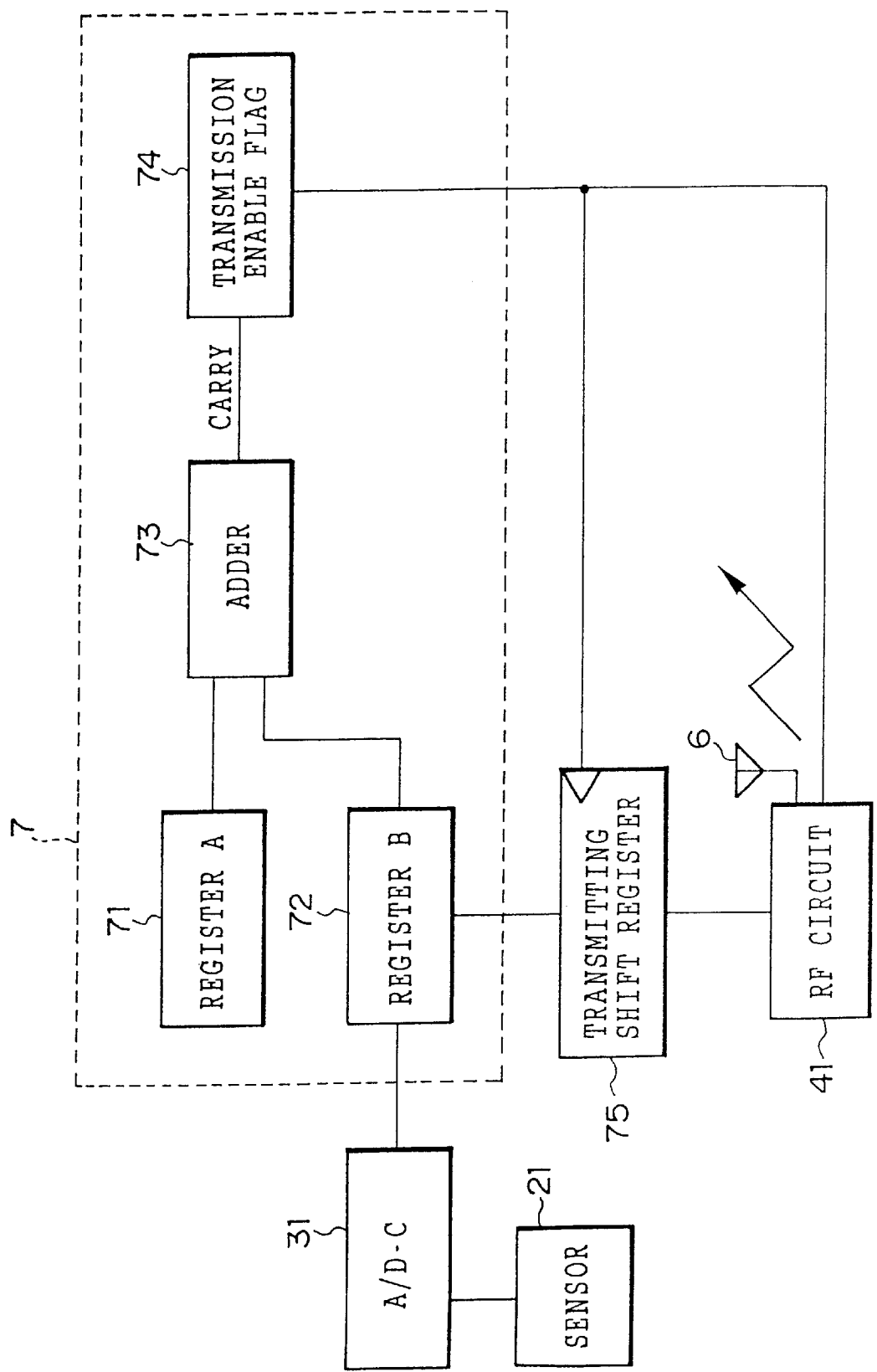
FIG. 1 is a block diagram which shows a preferred embodiment of a system in accordance with the present invention.
Figure 2:
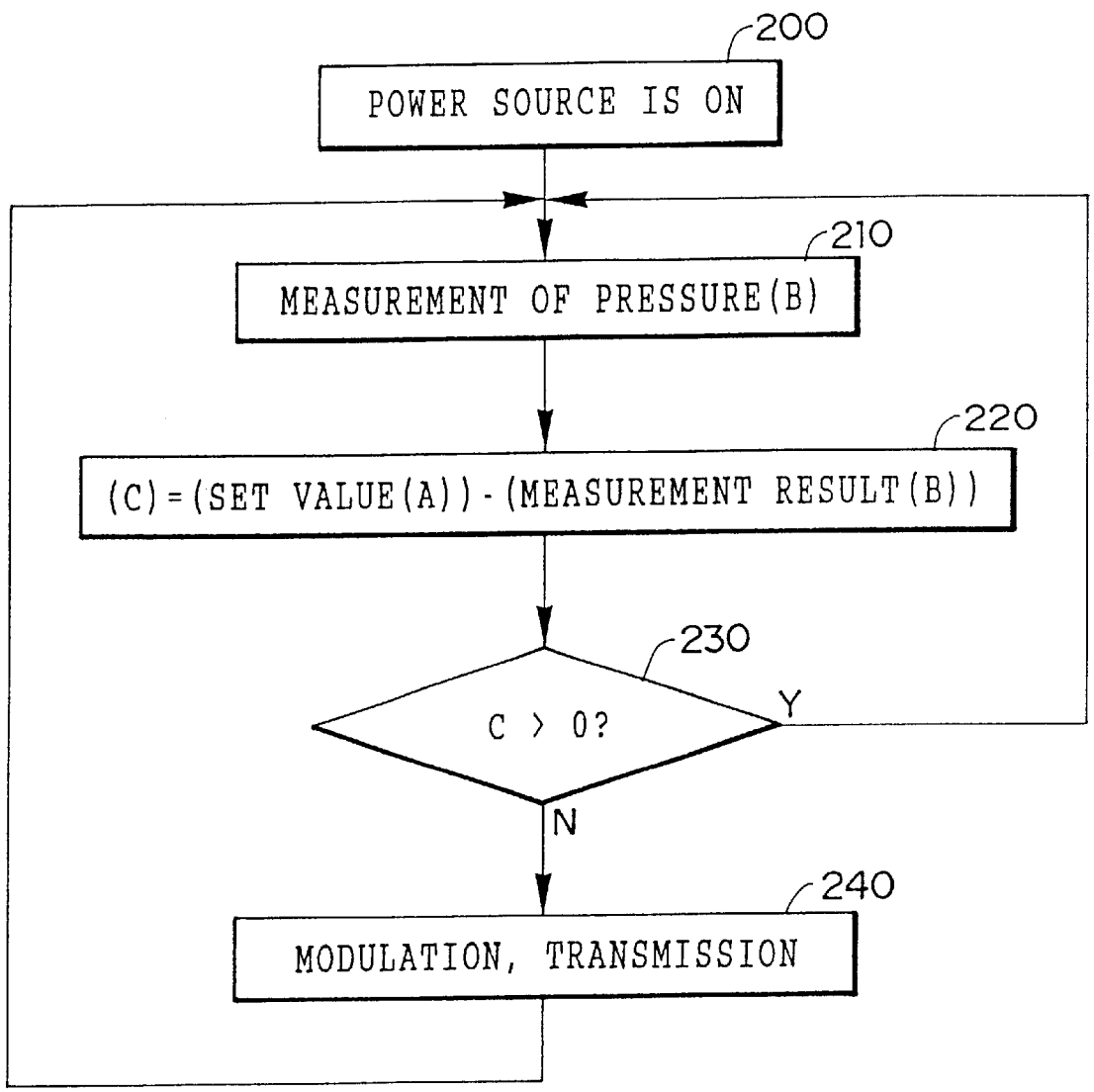
FIG. 2 is an operational logic flow diagram for the system of FIG. 1.
Figure 6:
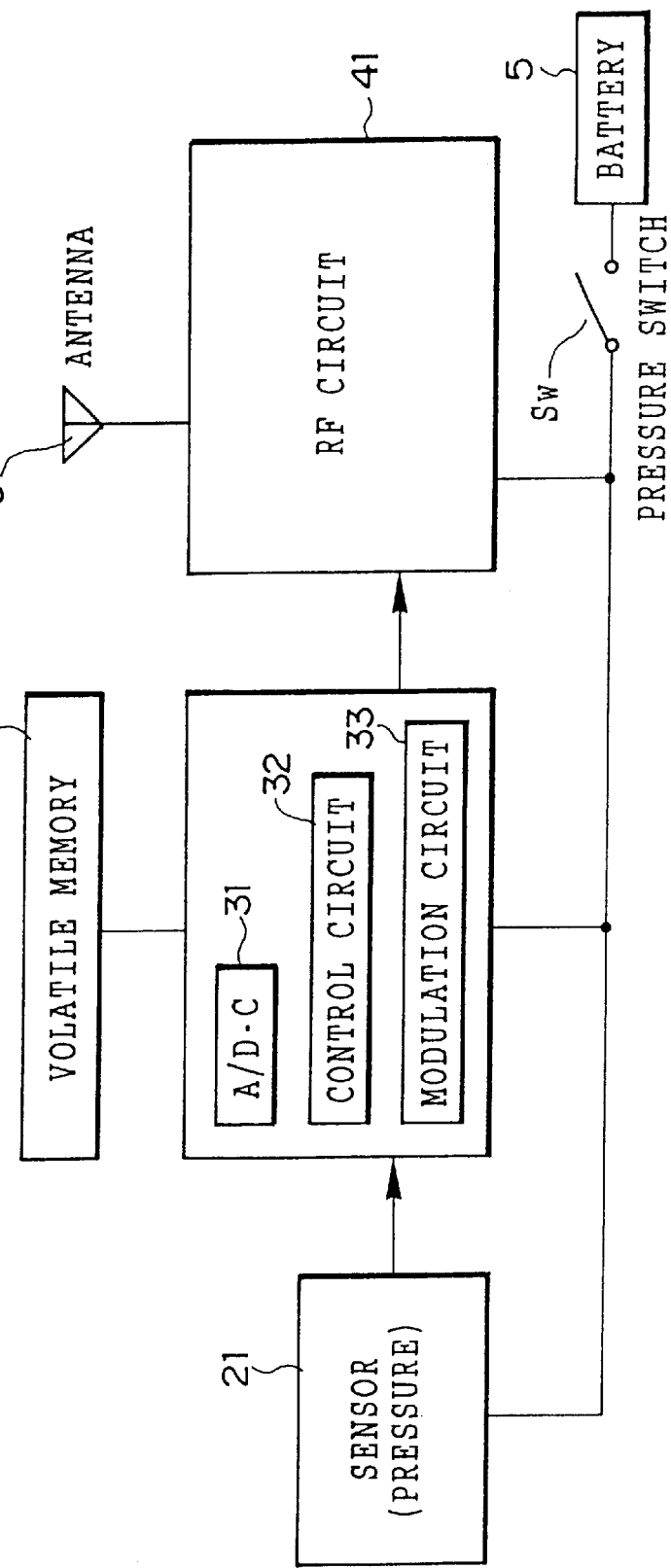
FIG. 6 is a block diagram which shows an applied example of the conventional system of FIG. 5.

FIG. 1 is a block diagram showing a first embodiment of a system according to the present invention, and FIG. 2 is a flow chart showing operational logic flow for the system. In FIG. 1, two registers 71 and 72 are provided parallel to each other and an adder 73 is provided at the output side of the registers 71 and 72. Reference numerals 74 and 76 denote a flag and a transmitting shift register, respectively. The registers 71 and 72, the adder 73, and the flag 74 form a control section 7 for the system, and the control section 7 is provided within the control circuit 32 previously shown in FIGS. 5 and 6. In one register 71, a value A is set and held corresponding to a tire pressure suitable for vehicle operation. Further, the other register 72 holds a detection value B corresponding to a tire pressure detected by the sensor 21.

Operation of the first preferred embodiment in accordance with the present invention will be hereinafter described, along with reference to FIG. 2. First, detection of tire pressure is carried out by the pressure sensor 21 (step 210). A detection value B corresponding to detected tire pressure via the A/D converter circuit 31 is outputted to the register 72. When the detection value B is inputted to the adder 73, comparison between the detection value B and a value A previously set in the register 71 (A−B) is repeatedly performed (step 220). In the comparison between the detection value B and the set value A (A−B), if a comparison result is A>B and the relation, A−B=C>0 results, the flag 74 is not set and the RF circuit 41 does not perform radio transmission via the antenna 6.

In other words, based on the comparison result (A−B) between the detection value B and the set value A, the modulation circuit 33 and/or the RF circuit 41, provided at the output side in the signal transmitting system, is controlled. When the value B detected by the sensor 21 is less than the set value A, the comparison between the set value A and the detection value B (A−B) is carried out repeatedly (step 210 to step 230). When the detection value B is greater than the set value A so as to satisfy the relation A<B, radio transmission of the monitor signal from the antenna 6 via the RF circuit 41 of the tire pressure monitoring system 1 is initiated (step 240).

As described above, in the tire pressure monitoring system 1 of the first embodiment, tire pressure detecting is initiated by the sensor 21 directly after manufacturing tires in the same way as in a conventional system. However, as described above, air pressure is not applied to fill the tires at the time of manufacturing, and the tires are normally placed in a warehouse or the like in substantially non-pressurized state after manufacturing. Subsequently, when a vehicle is actually operated with delivered tires being mounted to the axles thereof, the tires are each pressurized with air. In the first embodiment of the present invention, wireless transmission by the control section 7 is not carried out so long as the detection value B is smaller than the set value A. Accordingly, when tires are placed in storage, that is, the relation B<A is true, transmission by the RF circuit 41 (which has a high relative rate of electric power consumption) is prevented. Therefore, power consumption of the battery 5 is significantly reduced.

Table 1 illustrates a comparison between respective consumed current of the A/D converter circuit 31 and the RF circuit 41 in the tire pressure monitoring system 1 based on research performed by the present inventors. Table 1 indicates that regulation of the transmitting operation by the RF circuit 41 is effective for reducing the power consumption of the battery 5.

TABLE 1

| Circuit | Consumed current | Time |
| --- | --- | --- |
| A/D conversion | 400 µA | 150 ms |
| RF transmission | 3 mA | 200 ms |

[Second Embodiment]

In the above-described first embodiment, when the detection value B is smaller than the set value A, that is, B<A, transmission of the monitor signal is prevented. Accordingly, when tires rapidly deflate due to a puncture, the monitoring operation does not work. In the tire pressure monitoring system 1, detection of a puncture is not necessarily required. However, punctures can lead to occurrence of a vehicle accident. Therefore, it is desirable that monitoring detect punctures.

Figure 3:
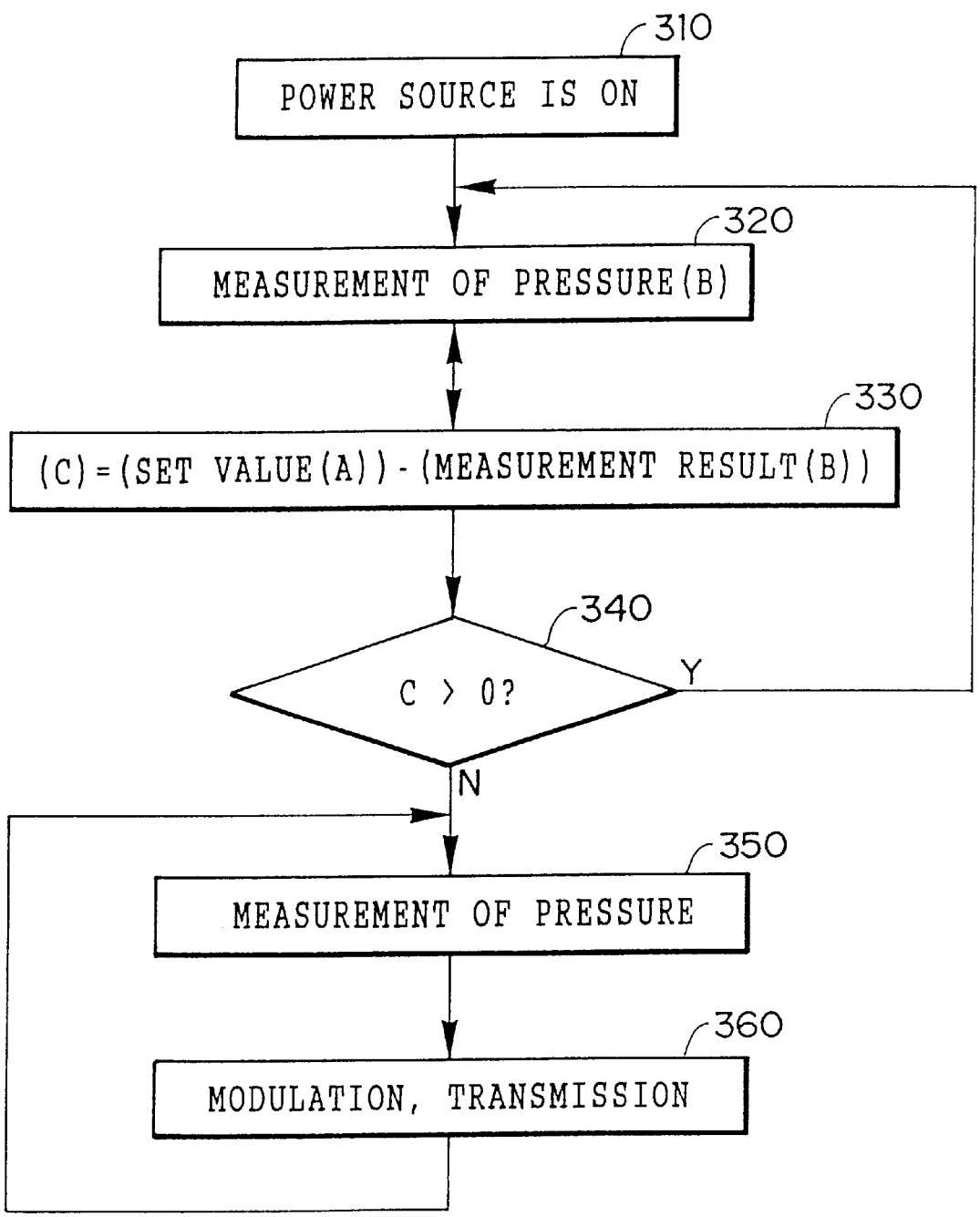
FIG. 3 is an operational logic flow diagram for another preferred embodiment of a system in accordance with the present invention.

Accordingly, in a second embodiment of the present invention, control operation of the control section 7 in the first embodiment is separated from a monitoring operation of a normal detection value by the sensor. As illustrated in FIG. 3, transmission of a monitor signal based on the comparison result (A−B) of the control section 7 is carried out at an initial stage. Subsequently to the initial operation, monitor transmission of the detection value B is carried out by a normal routine (an operation after tires have been mounted to a vehicle).

In the second embodiment, after the power source is turned on, the comparison between the detection value B of the pressure sensor 21 and the set value A by the control section 7 is repeatedly carried out as an initial operation (step 320 to step 340). Even when radio transmission is started in a state in which the detection value B of the pressure sensor 21 becomes the set value A or greater, monitor transmission of the detection value B corresponding to a present tire pressure detected by the pressure sensor 21 is continuously repeated (step 350 and step 360). For this reason, even in the case of rapid deflation due to a puncture (even if tire pressure reduces to an amount close to atmospheric pressure), the tire pressure monitoring system 1 continues to operate.

When the monitoring operation shown in FIG. 3 is executed, the detection value B is constantly transmitted after the tires have been manufactured so as to be suitable for vehicle operation. Therefore, the monitoring operation can be carried out even when the tire pressure is substantially reduced due to a puncture or the like. This is an unnecessary function during vehicle operation due to the reason that the puncture is usually noticed by vehicle occupants. But it serves as an alarm when a vehicle is about to be started, when a puncture may not be noticed, such as when a vehicle is parked, and thus has an important function. Further, since power consumption is restrained by the tire pressure monitoring system 1 itself, operation thereof is normally carried out at a slow clock signal. The comparison in the middle of the operation is omitted. Hence, transmission time can be reduced by several mS. Accordingly, a tire pressure monitoring system is provided having good improved reactivity, relative to the previously described embodiment.

[Third Embodiment]

Figure 4A:
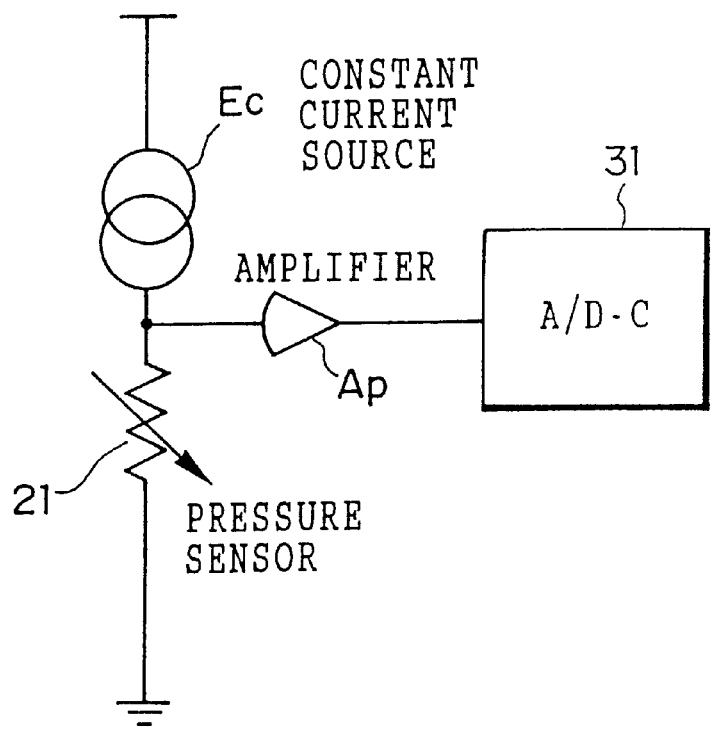
FIG. 4A is a diagram which shows a circuit structure when a pressure sensor is used.
Figure 4B:
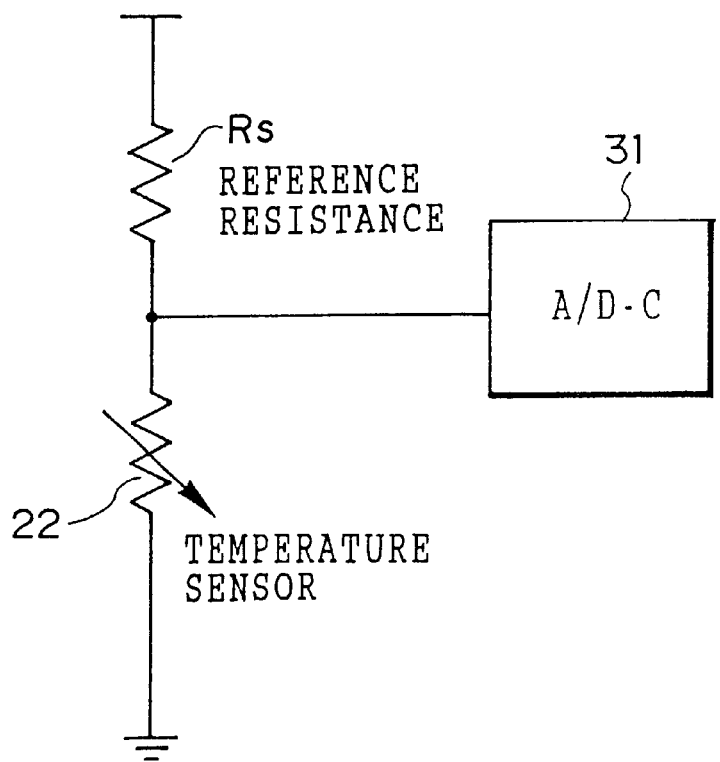
FIG. 4B is a diagram which shows a circuit structure when a temperature sensor is used.

FIGS. 4A and 4B each show a circuit diagram in the periphery of the pressure sensor or the temperature sensor, and respective consumed current in the A/D conversion during measurement (detection) of pressure and during measurement (detection) of temperature are shown in Table 2. In FIGS. 4A and 4B, reference numerals 21 and 22 respectively denote a pressure sensor and a temperature sensor, such as an NTC thermistor. Further, Ec represents a constant current source, Ap represents an amplifier, and Rs represents a reference resistance. Wherein pressure is represented by P, volume of 1 mol is represented by V, and temperature is represented by T, the following equation of state is known:

$$RV=RT$$

wherein, R is a gas constant.

In the first and second embodiments, a case in which the pressure sensor 21 is used for detection of tire pressure was described as an example. However, the tire pressure monitoring system 1 can be formed by utilizing an output temperature of the temperature sensor 22. obtained from the above-described equation to thereby control transmission. In the temperature sensor 22, a temperature during vehicle operation is estimated and set in advance. In consideration of a case in which absorption of heat from a brake is caused in addition to the temperature at the time of vehicle operation, the temperature can be adjusted accordingly. Further, pickup value in the temperature sensor 22 varies greatly as compared with the pressure sensor 21, and therefore, a pre-amplifier is unnecessary and consumed current can be reduced. FIGS. 4A and 4B show circuit diagrams in the peripheries of the sensors, and Table 2 shows the example of comparison of consumed current.

TABLE 2

| Conditions | During measurement of pressure | During measurement of temperature |
|---|---|---|
| Consumed current | 400 μA | 250 μA |

In each of the above-described embodiments, the transmitting operation is carried out only when a power source is turned on. If the set value A is set at a value of tire pressure, that is dangerous (for example, 1.9 kg or thereabouts in tires of a vehicle which requires a pressure of 2.2 kg or thereabouts), monitoring cannot normally be carried out. However, it can be operated as an alarm in case of emergency. Further, in each of the above-described embodiments, hardware such as a register or an adder is added. Nonetheless, when a main control unit (MCU) is used in the control circuit, the same effects as those of the present invention can be achieved without the addition of any special hardware.

In the first embodiment, a tire pressure monitoring system which allows radio transmission, via a transmitting section, of a monitor signal of a detection value of tire pressure, includes a control section in which a detection value of the sensor is compared with a set value, and based on a comparison result, radio transmission of the monitor signal is controlled.

Further, in the first embodiment, prior to a normal radio transmitting operation of the monitor signal of the detection value by the sensor, the radio transmitting operation of the monitor signal is controlled by the control section.

Moreover, in the first or second embodiment, the sensor is comprised of a temperature sensor.

Still further, in the present invention, a tire pressure monitoring system is provided, having a control section including a register holding a set value corresponding to a tire pressure at the time of starting transmission, a register which holds a detection value detected by the sensor, an adder which makes comparison between the set value and the detection value, and a transmission enable flag which switches transmission of the transmitting section in accordance with an addition result of the adder.

Therefore, according to the present invention, when the detection value detected by the sensor is a low pressure close to atmospheric pressure directly after manufacturing of tires or during the period in which tires are placed in storage, the radio transmission by the transmitting section is prevented. Hence, unnecessary excess consumption of a battery power source can be avoided. Further, control operation by the control section, which allows radio transmission at a predefined tire pressure or greater, and radio transmission of a normal detection value are combined with each other. Therefore, unnecessary consumption of the battery power source is avoided, and punctures or an abnormal condition of tire pressure can be sensed. Particularly, so long as the temperature sensor is used as a sensor for detecting tire pressure, a constant voltage circuit or an amplifier (pre-amplifier) each having a complicated structure are not required. Thus, a monitoring system having reduced manufacturing cost can be achieved.

Hence, according to the present invention, a tire pressure monitoring system is provided, having reduced cost, in which a battery power source can be more effectively utilized and having relatively simple structure.

What is claimed is:

1. A tire pressure monitoring system driven by a battery, comprising:

a comparator which makes a comparison between a predetermined value and a detection value of any one of tire pressure and an amount related to tire pressure and determines when the pressure changes from a pressure suitable for tire storage to a pressure suitable for use on a vehicle; and a controller which controls so as to start transmission of the detection when said comparator determines that the tire pressure has changed from the pressure suitable for tire storage to the pressure suitable for use on a vehicle.

2. A tire pressure monitoring system driven by a battery, comprising:

a sensor which detects any one of tire pressure and an amount related to tire pressure;

a transmitter which transmits a detection value detected by said sensor; and a controller which makes a comparison between a predetermined value and the detection value detected by said sensor and determines when the pressure changes from a pressure suitable for tire storage to a pressure suitable for use on a vehicle, and, when the detection value is greater than the predetermined value, determines that the tire pressure has changed from the pressure suitable for tire storage to the pressure suitable for use on a vehicle and controls said transmitter so as to start transmission of the detection value.

3. A tire pressure monitoring system according to claim 2, wherein when the detection value is less than the predetermined value, said controller controls said transmitter so as not to cause transmission of the detection value.

4. A tire pressure monitoring system according to claim 2, wherein after transmission of the detection value is once started, said controller controls said transmitter so as not to stop the transmission.

5. A tire pressure monitoring system according to claim 2, wherein said sensor is a pressure sensor for detecting tire pressure.

6. A tire pressure monitoring system according to claim 2, wherein said sensor is a temperature sensor for detecting a temperature related to tire pressure.

7. A tire pressure monitoring system according to claim 2, wherein said controller includes:

a first storage device for holding the predetermined value;

a second storage device for holding the detection value;

a comparator which makes a comparison between the predetermined value held in said first storage device and the detection value held in said second storage device; and a transmission enable flag which is set based on a result of the comparison by said comparator, said controller being provided to control said transmitter based on setting of said transmission enable flag.

8. A tire pressure monitoring system according to claim 2, wherein a memory in which an identification inherent in each tire is stored is provided, and the identification is transmitted together with the detection value during the transmission.

9. A tire pressure monitoring system according to claim 2, wherein the controller makes another comparison between another predetermined value and the detection value detected by said sensor and determines when the tire pressure changes from the pressure suitable for use on a vehicle to the pressure suitable for tire storage, and, when the detection value is less than the other predetermined value, determines that the tire pressure has changed from the pressure suitable for use on a vehicle to the pressure suitable for tire storage and controls said transmitter so as to stop transmission of the detection value.

10. A tire pressure monitoring method comprising the steps of:

(a) detecting any one of tire pressure and an amount related to tire pressure;

(b) comparing a detection value detected in said step (a) with a predetermined value and determining when the pressure changes from a pressure suitable for tire storage to a pressure suitable for use on a vehicle; and (c) when a result of the comparison in said step (b) is that the detection value is greater than the predetermined value, determining that the tire pressure has changed from the pressure suitable for tire storage to the pressure suitable for use on a vehicle and starting transmission of the detection value.

11. A tire pressure monitoring method according to claim 10, wherein in said step (c), when the detection value is less than the predetermined value, transmission of the detection value is stopped.

12. A tire pressure monitoring method according to claim 10, wherein in said step (c), after the transmission is once started, the transmission of the detection value in said step (b) is not stopped.

13. A tire pressure monitoring method according to claim 10, further comprising the steps of:

(d) comparing the detection value detected in said step (a) with another predetermined value and determining when the tire pressure changes from the pressure suitable for use on a vehicle to the pressure suitable for tire storage; and (e) when a result of the comparison in said step (d) of comparing the detection value detected in said step (a) with another predetermined value is that the detection value is less than the other predetermined value, determining that the tire pressure has changed from the pressure suitable for use on a vehicle to the pressure suitable for tire storage and stopping transmission of the detection value.

* * * * *